United States Patent [19]
Seto

[11] Patent Number: 5,673,064
[45] Date of Patent: Sep. 30, 1997

[54] SIMPLIFIED VECTOR-FORMAT PATTERN GENERATION

[75] Inventor: Kunio Seto, Kawasaki, Japan

[73] Assignee: Canon Kabushiki Kaisha, Tokyo, Japan

[21] Appl. No.: 536,677

[22] Filed: Sep. 29, 1995

Related U.S. Application Data

[63] Continuation of Ser. No. 153,168, Nov. 17, 1993, abandoned.

[30] Foreign Application Priority Data

Nov. 30, 1992 [JP] Japan .................................. 4-320669

[51] Int. Cl.$^6$ ........................................................ G09G 5/00
[52] U.S. Cl. ................................................ 345/127; 345/142
[58] Field of Search ............................... 345/192, 194, 345/195, 189, 141, 143, 142, 144, 127, 128, 129, 130; 395/150, 151, 167, 168

[56] References Cited

U.S. PATENT DOCUMENTS

| | | | |
|---|---|---|---|
| 3,810,166 | 5/1974 | Atkin | 345/192 |
| 4,251,871 | 2/1981 | Yu | 395/150 |
| 4,429,306 | 1/1984 | Macauley et al. | 345/195 |
| 4,621,340 | 11/1986 | Pokorny et al. | 395/150 |
| 4,670,841 | 6/1987 | Kostopoulos | 345/192 |
| 5,086,455 | 2/1992 | Satomi et al. | 379/100 |
| 5,367,620 | 11/1994 | Ito et al. | 395/150 |

FOREIGN PATENT DOCUMENTS

| | | |
|---|---|---|
| 481518A2 | 10/1990 | European Pat. Off. . |
| 3634185 | 3/1986 | Germany . |
| 4124554 | 1/1992 | Germany . |
| 2-278475 | 11/1990 | Japan . |
| 4-81892 | 3/1992 | Japan . |
| 82061 | 11/1986 | Taiwan . |
| 79-104684 | 6/1990 | Taiwan . |
| 2213681 | 8/1989 | United Kingdom . |
| 2218297 | 8/1989 | United Kingdom . |

OTHER PUBLICATIONS

Chinese Character Arrangement System; Wongshun et al; May 1985.

*Primary Examiner*—Chanh Nguyen
*Attorney, Agent, or Firm*—Fitzpatrick, Cella, Harper & Scinto

[57] ABSTRACT

A character pattern generating method and apparatus which enables storage of a large amount of font data with a small memory capacity and increase pattern-bitmapping speed. The apparatus stores element information representing common elements for constructing patterns and construction information indicating the construction of each pattern in a font data memory such as a ROM. The sets of element information corresponding to a specified pattern are developed into bitmap data in an element bitmap area. The bitmapped data are synthesized in accordance with construction information for the pattern to be generated.

12 Claims, 13 Drawing Sheets

FIG. 5

| NUMBER OF ELEMENTS ( = 8 ) | | | |
|---|---|---|---|
| 1 | $(Cx, Cy)_1$ | $(Cw, Ch)_1$ | EN : 1 |
| 2 | $(Cx, Cy)_2$ | $(Cw, Ch)_2$ | EN : 2 |
| 3 | $(Cx, Cy)_3$ | $(Cw, Ch)_3$ | EN : 3 |
| 4 | $(Cx, Cy)_4$ | $(Cw, Ch)_4$ | EN : 4 |
| 5 | $(Cx, Cy)_5$ | $(Cw, Ch)_5$ | EN : 5 |
| 6 | $(Cx, Cy)_6$ | $(Cw, Ch)_6$ | EN : 6 |
| 7 | $(Cx, Cy)_7$ | $(Cw, Ch)_7$ | EN : 7 |
| 8 | $(Cx, Cy)_8$ | $(Cw, Ch)_8$ | EN : 8 |

SIMPLIFIED VECTOR-FORMAT PATTERN GENERATION

This application is a continuation of application Ser. No. 08/153,168, filed Nov. 17, 1993, now abandoned.

BACKGROUND OF THE INVENTION

The present invention relates to a pattern generating method and apparatus for generating a pattern based on font data. The present invention is particularly advantageous as applied to generation of character patterns, therefore, the description in this specification is made on pattern character generation.

Recently, users' needs for generating higher-quality characters for displayed or printing have increased. To meet this demand, it is necessary to employ outline fonts which realize high-quality character output in place of conventional bitmap fonts. An outline font has coordinate values of a plurality of points (control points) obtained by sampling outlines of a character as font data, and is stored in the form a body of information in a font memory, typically a ROM. The coordinate values are read out as needed and are converted in accordance with the required character size and/or font. Thereafter, the insides of the outlines (that is, the areas enclosed by the respective outlines) are filled in to complete a character pattern. Compared with the conventional bitmap font, an outline font affords higher character generating freedom, and can smoothly generate characters without jagged edge portions, in any size.

However, compared with bitmap font data, internal representation of font data is more complicated. To improve the character quality of a font, the number of sampling points for each outline must be increased. The greater the number of sampling points, the greater the number of coordinate values of control points, increasing the quantity of font data. This requires a large capacity ROM for storing the font data, which raises the costs of products. In addition, conversion of the coordinate values to bitmap data is slow due to the increased number of control point coordinate values. Thus, the desirable process speed in a low-cost character generating device cannot be achieved.

SUMMARY OF THE INVENTION

The present invention has been made in consideration of the above situation, and has as its object to provide a method and apparatus for generating patterns such as character patterns which enables storage of a large amount of font in a small memory capacity.

Another object of the present invention is to provide a method and apparatus for generating patterns such as character patterns which increases developing speed in conversion from font data to a bitmap pattern.

According to an aspect of the present invention, figure information representing common figure elements for constructing a pattern and construction information indicating the construction of each pattern with figure elements are stored. Figure information corresponding to a specified pattern is developed into bitmap data. The bitmapped data is synthesized in accordance with the construction information, and the specified pattern is made.

Further, according to another aspect of the present invention, figure information representing common figure elements for constructing a pattern and construction information indicating the construction of each pattern with figure elements are stored. Sets of figure information corresponding to a specified pattern are developed into bitmap data, and the bitmapped data are stored in correspondence with the figure information. When a pattern is specified, before its set(s) of figure information are developed into bitmap data, a check is made to see if the bitmap data is already stored. If the bitmap data is stored, it is read out, while if not, the set of figure information are developed into bitmap data. The bitmapped data is synthesized to the specified pattern in accordance with the construction information of the pattern.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 5 illustrates a data format of the element construction information;

DETAILED DESCRIPTION OF THE PREFERRED EMBODIMENT

The preferred embodiment of the present invention will be described in detail in accordance with the accompanying drawings.

Figure 1:
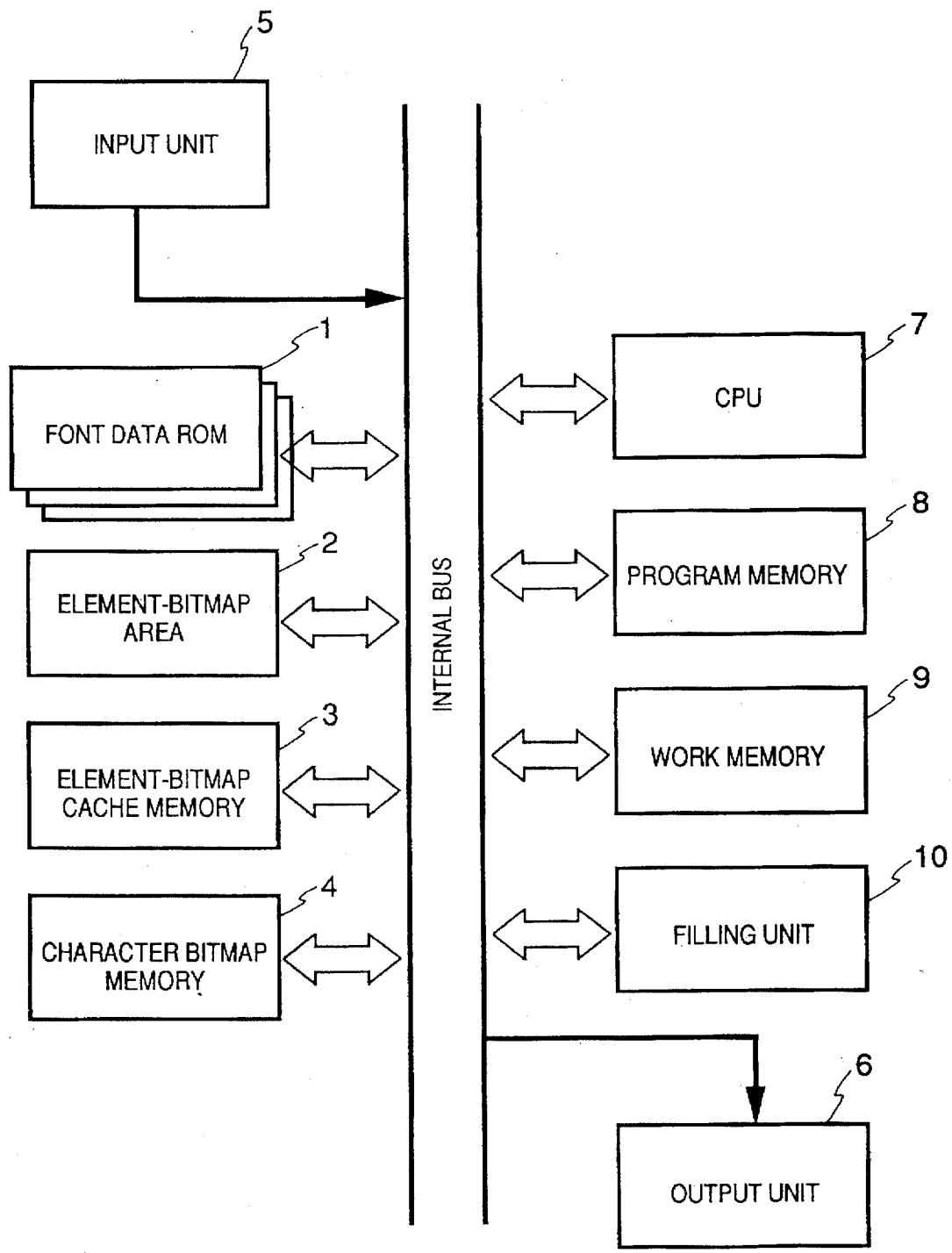
FIG. 1 is a block diagram showing the configuration of a character pattern generating apparatus according to an embodiment of the present invention.

FIG. 1 shows the configuration of a character generating apparatus according to the preferred embodiment of the present invention. The character generating apparatus may be a computer device such as a work station and a personal computer, or may be a character generating device incorporated in a display or a printer.

Figure 3:
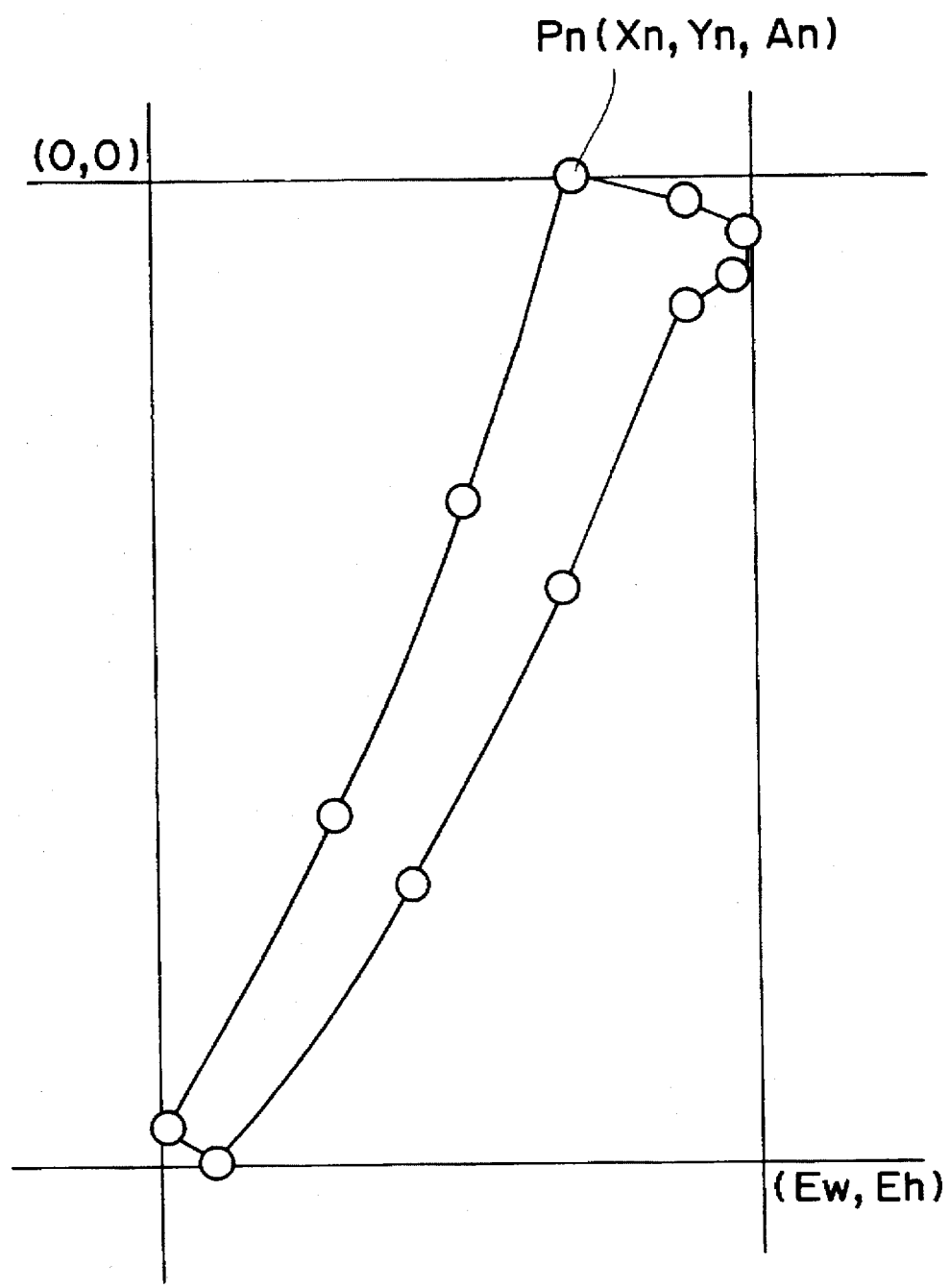
FIG. 3 is a diagram showing an example of element pattern information.
Figure 4:
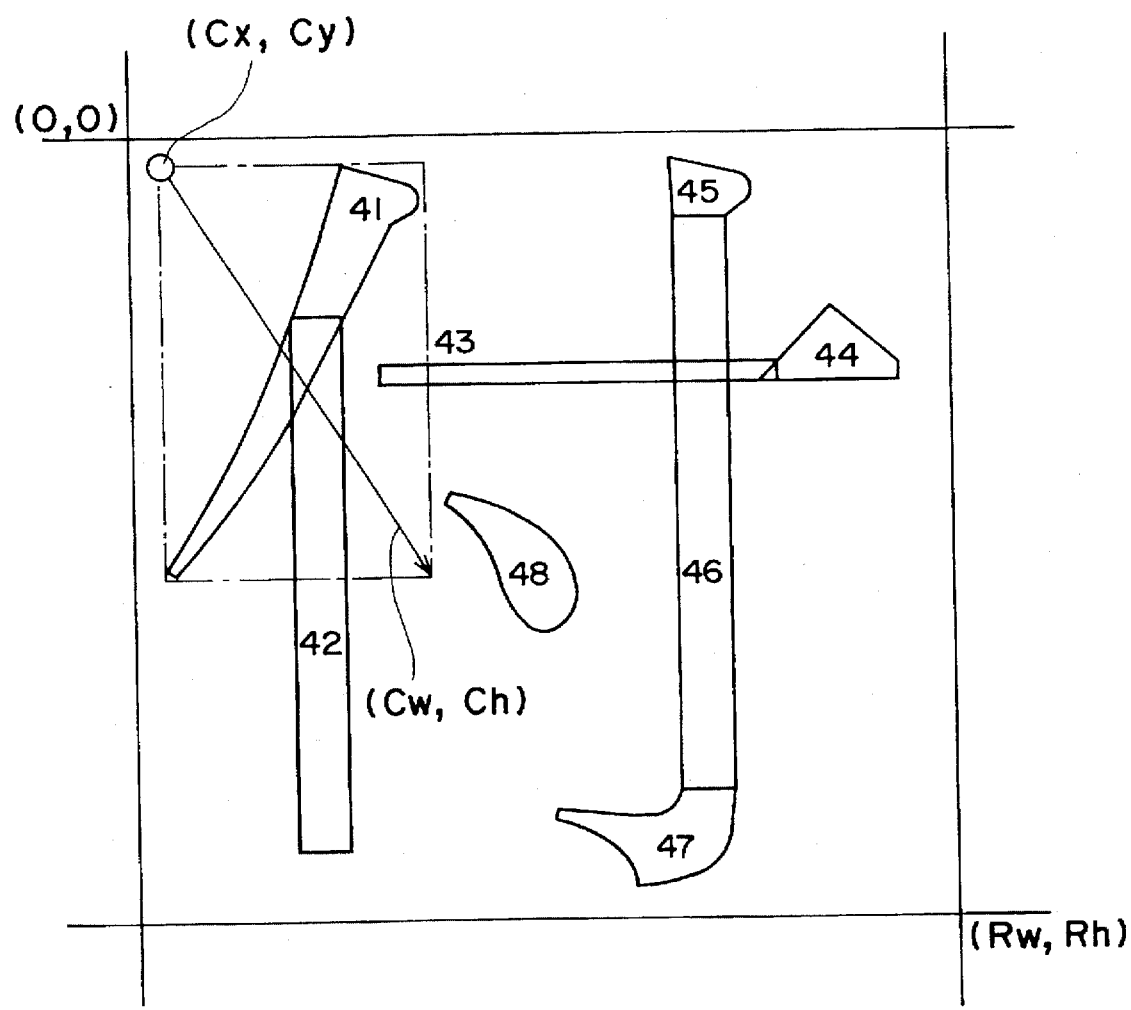
FIG. 4 illustrates element construction information for the Kanji character "付 (TSUKI)" in this embodiment.

In this embodiment, as shown in FIG. 4, a Mincho Kanji character "付" is divided-into plural elements 41 to 48, and as shown in FIG. 3, each element is stored as a element pattern, which be either figure element unique to the character in question, or as here a figure element common to other characters.

In FIG. 1, reference numeral 1 denotes a font data ROM in which font data (outline font data in this embodiment) for generating characters is stored. The font data ROM 1 has index information such as font index, character index and element index corresponding to a parameter inputted from the outside, for specifying a character (hereinafter referred to as "character generation instruction"), element construction information for determining each character pattern, and element pattern information. Numeral 2 denotes an element bitmap area for storing a bitmapped element pattern; 3, an element-bitmap cache memory (hereinafter referred to as "EB cache") for storing an element image bitmapped in the element bitmap area 2 with additional information for re-use of the bitmap data; 4, a character bitmap memory for storing a final bitmap image (hereinafter referred to as "character bitmap") of the specified character; and 5, an input unit for inputting the character generation instruction from the outside. The input unit 5 may be an input device such as a keyboard or may be an interface of SCSI (Small Computer System Interface) or GPIB (General Purpose Interface Bus), type or further, it may be a pre-produced document information file having the necessary information.

Numeral 6 denotes an output unit for outputting a character bitmap stored in the character bitmap memory 4. The output unit 6 may be any hard copy equipment such as a printer, any display such as a CRT, a video RAM for outputting to a monitor using such as CRT, or a page memory for temporarily storing a document image in bitmap format. Numeral 7 denotes a CPU for controlling the overall character generating apparatus; 8, a program memory for storing various control programs executed by the CPU 7; 9, a work memory for temporarily storing various data upon execution of the control processing by the CPU 7; and 10, a filling in unit for filling the outlines of a character pattern made from outline font data.

The present character generating apparatus will be described below with reference a case where a character generation instruction inputted from the input unit 5 instructs production as a Mincho character of the Kanji in an "付" output bitmap size of 64×64, as one embodiment of the present invention.

Figure 2:
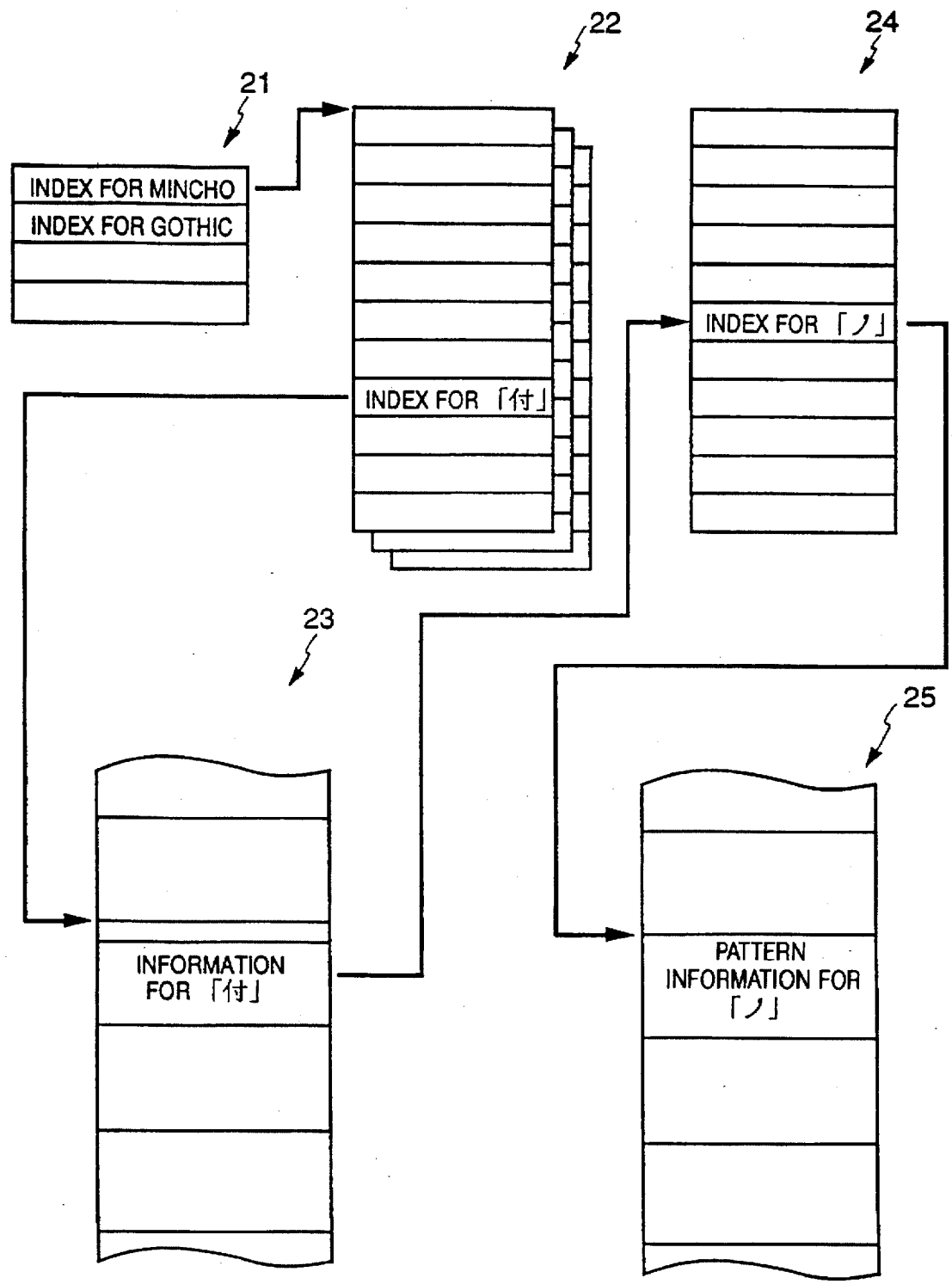
FIG. 2 illustrates the data structure of a font data ROM in this embodiment.

FIG. 2 shows in detail the data structure of the font data ROM 1.

Numeral 21 denotes a font index having a header address of an area where a character index (to be described later) corresponding to each font designated by a font parameter (Mincho, Gothic style, etc.) is stored. Numeral 22 denotes a character index having a header address of an area where element construction information (to be described later) of each character designated by a character code parameter of character generation instruction and its data length are stored. Numeral 23 denotes element construction information showing the construction of (in this embodiment) a Kanji character ("付") specified by a font parameter (Mincho) and a character code parameter (character code "4955" of "付"). The information 23 includes an index number of element index 24. The element index 24 includes a header address of an area where element pattern information and its data length are stored. Numeral 25 denotes element pattern information in which common figure elements are stored with their outline coordinate values and additional information. The common figure elements for constructing a character will be described with reference to FIG. 3 hereinafter.

FIG. 3 shows a typical example of an element pattern information stored in the element pattern information 25.

"Element" means an outline indicating a part of a character pattern. Each element is indicated by the arrangement of coordinate values (Xn, Yn) of control points Pn to specify the outline. Further, each element includes additional information such as attribute information (An), e.g., to specify a straight line/curved line as a connection line between the control points, and the largest measurements of the element (Ew (width), Eh (height)).

FIG. 4 shows the element information for a Mincho style Kanji character "付" to be stored as element construction information 23. It should be noted that the element construction information may be applicable to any kind of character, e.g., a Kanji character, an alphabet character, or to any other symbolic figure, which generally may be a very simple figure element (* or "primitive graphic element") such as a rectangle or a circle, and further, it may be a combination of figure elements proper to a specified font.

In FIG. 4, elements 42, 43 and 46 respectively indicate a simple figure element, i.e., a rectangular part. Elements 41, 44, 45, 47 and 48 are figure elements unique to the typeface. For example, in typeface designing, the element 41 is called "hidari-harai"; 44, "uroko"; and 45, "tate-uchikomi". These are significant figure elements for defining each typeface of the font. Accordingly, such figure elements are commonly used and in fact are used in the character figures of more than six thousand characters (in level 1 and 2 Japanese standard (JIS) Kanji characters). In English characters, in certain typefaces, the part called the "serif" can be the subject of this figure element conception. Similar features are found in other language characters such the Hangul alphabet. Therefore, this figure element concept is useful to processing of various language characters and figures.

FIG. 5 shows data stored in the element construction information 23 regarding the Mincho style Kanji character "付" in FIG. 4.

The element construction information 23 includes number of the elements 41 to 48 (eight) constructing the character "付", location information (Cx, Cy) and size information (Cw, Ch) with respect to each element, and element number EN for specifying a pattern of element. Note that as the elements 42, 43 and 46 are simple rectangles, these elements can be a common element. Consequently, the element numbers EN of these elements are the same. As described above, since some elements are common to various language characters and typeface, each of them can be assigned the same serial number through all fonts used in the system, or they can be assigned unique numbers depending upon respective languages/typefaces.

Figure 6:
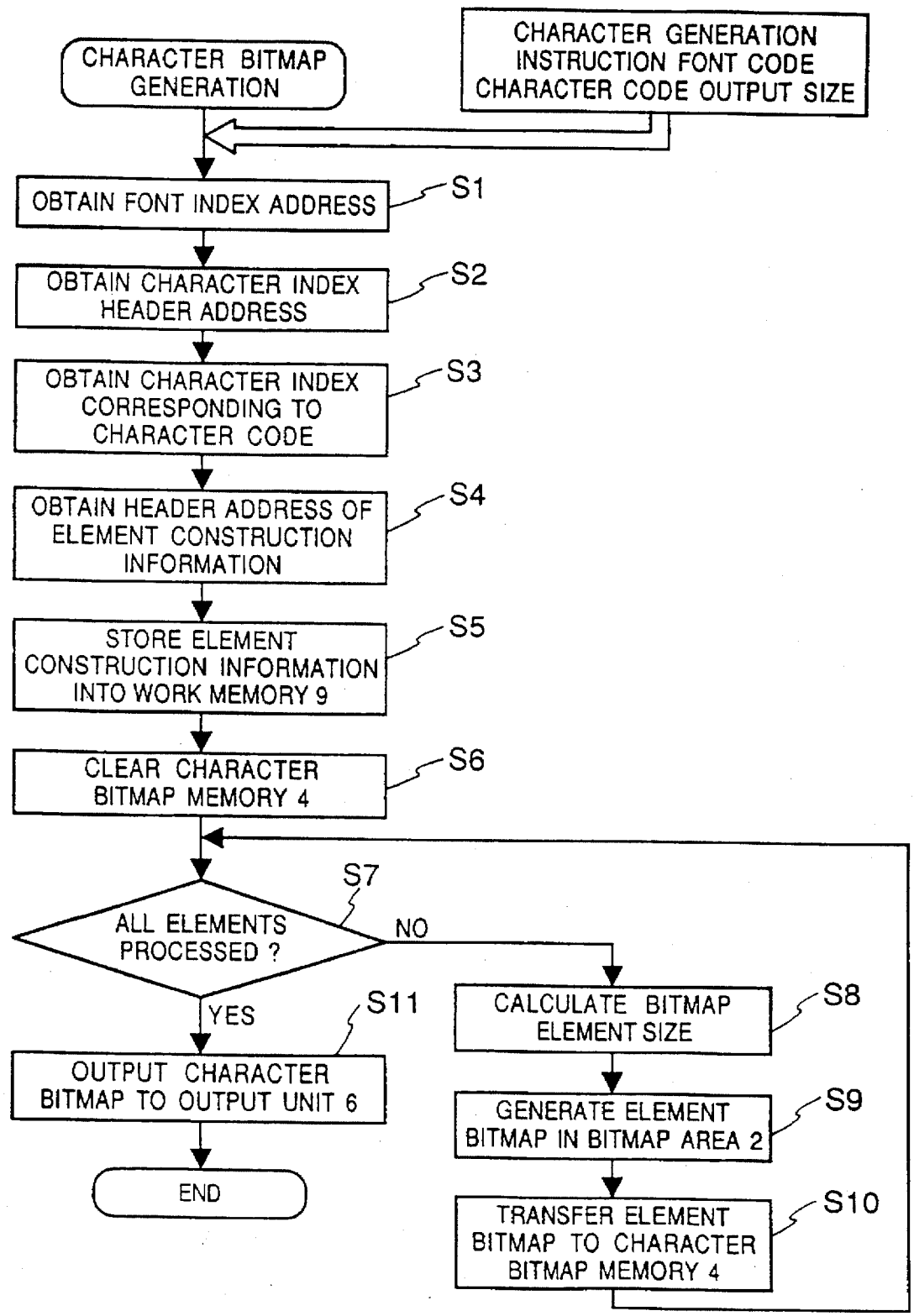
FIG. 6 is a flowchart showing character pattern generation processing in the character pattern generating apparatus of this embodiment.

FIG. 6 shows the character generating processing, in which a character generation instruction including a font code, a character code and output size from the input unit 5 is inputted, and a specified character as a character is generated and outputted to the output unit 6. This processing is executed by the CPU 7 and the program for controlling this processing is stored in the program memory 8.

First, based on a font code (e.g. Mincho, Gothic etc.), an address of a corresponding font index in the font index 21 is obtained in step S1. In step S2, based on the font index 21, a header address of a corresponding character index 22 is obtained. In step S3, character index corresponding to the input character code is found from the header address of the character index 22. In step S4, a header address of an area in which element information of the character is stored is obtained from the character index, and the element construction information is read and stored in the work memory 9.

As described above, when a JIS (Japanese Industrial Standard) character code "4955" ("付") is inputted and Mincho is designated by a font code, the entries or sets of element information (FIG. 5) for the elements 41 to 48 in FIG. 4 are read out and are stored in the work memory 9.

Next, the process proceeds to step S6 in which the character bitmap memory 4 is cleared. In step S7, whether all the elements stored in the work memory 9 are processed or not is determined. If YES, the process to step S11, while if NO, proceeds to step S8, in which the size of bitmap element is calculated based on the location information (Cx, Cy) and size information (Cw, Ch) of each element. This processing will be described later in detail with reference to the flowchart of FIG. 8. In step S9, in accordance with this calculation result, the element outline are filled in, and the filled in elements are developed into a bitmap in the element bitmap area 2 by the filling unit 10. The obtained element bitmap information is transferred to the character bitmap memory 4, where it is combined with the bitmap data of other elements based on each set of location information (Cx, Cy). Finally, by these steps, a character pattern is formed.

It should be noted that step S10 may be performed by software or by using a dedicated hardware circuit. Further, a curved line representation in the present embodiment may be realized by any representation. For example, it may be a parametric expression with polynomial functions or a circular arc definition. Also, a straight line representation connecting all the outline point coordinates may be employed.

Figure 7:
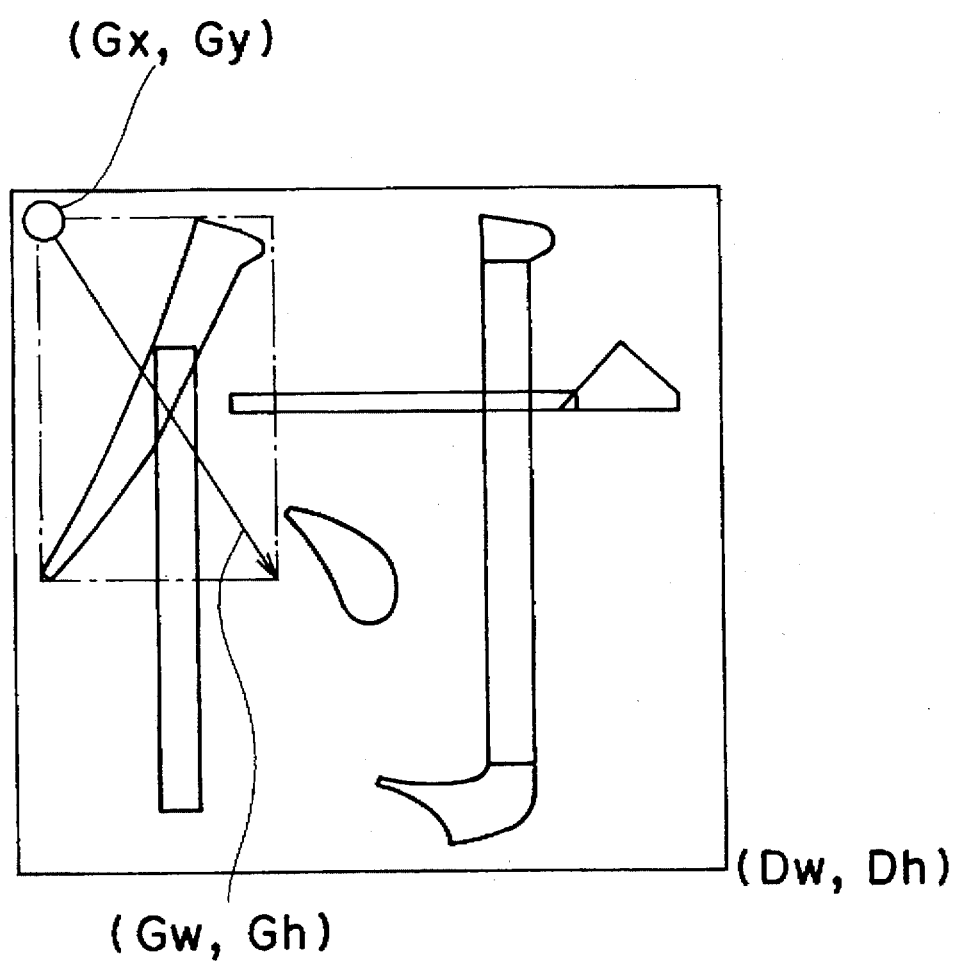
FIG. 7 is a diagram for explaining the size of bitmap data of the Kanji character "付" in this embodiment.

FIG. 7 shows the size of each element corresponding to a designated character size from the input unit 5.

In FIG. 7, coordinate (Dw, Dh) indicates the designated character size; (Gx, Gy), the bitmapped location (upper left) of the element 41 "hidari-harai" of the character "付"; and (Gw, Gh), the size of the bitmapped element 41.

Figure 8:
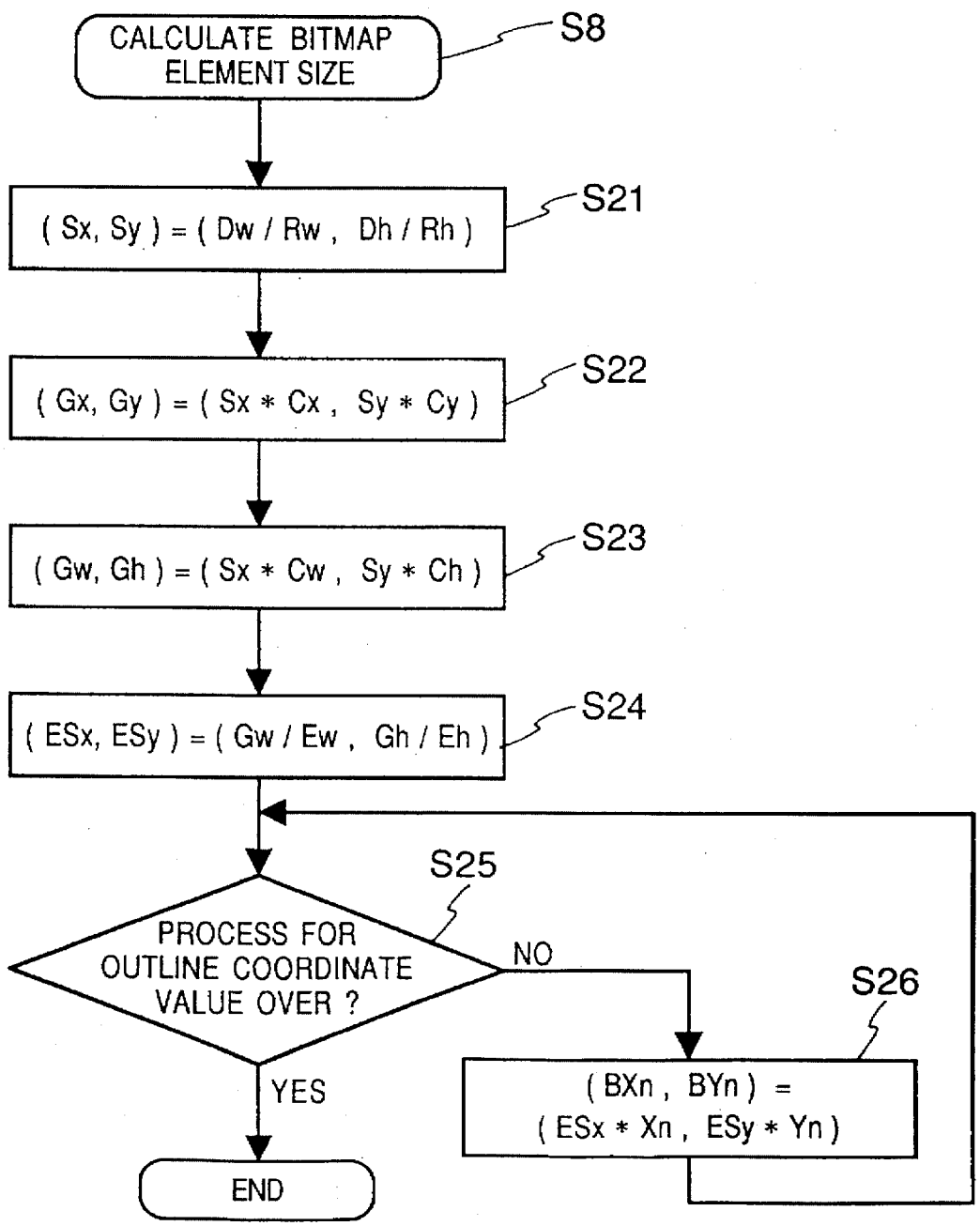
FIG. 8 is a flowchart showing calculation of the bitmap data size in step S8 of FIG. 6.

Next, processing of calculating element bitmap size in step S8 in FIG. 6, i.e., the bitmapped element size calculation from element construction information of the character "付" will be described with reference to the flowchart of FIG. 8.

In step S21, the scale factor (Sx, Sy) for converting from a basic character size (Rw, Rh) (FIG. 4) into the character size to be bitmapped (Dw, Dh) (FIG. 7) is obtained by:

$$(Sx, Sy) = (Dw/Rw, Dh/Rh)$$

The basic character size (Rw, Rh) is a font data size predefined in the character generating apparatus of the present embodiment, and is a predetermined numerical value.

In step S22, a location of each element to be bitmapped (Gx, Gy) (FIG. 7) is obtained based on the element's location (Cx, Cy) (FIG. 4) and the scale factor (Sx, Sy):

$$(Gx, Gy) = (Sx*Cx, Sy*Cy)$$

The location (Cx, Cy) is a predefined numerical value stored in the element construction information 23.

In step S23, a location of each element to be bitmapped (Gx, Gy) (FIG. 7) is obtained based on the basic element size (Cw, Ch) (FIG. 4) and the scale factor (Sx, Sy):

$$(Gw, Gh) = (Sx*Cw, Sy*Ch)$$

The element size (Cw, Ch) is a predefined numerical value stored in the element construction information 23.

In step S24, a scale factor of each element (ESx, ESy) is obtained based on a basic size of the element (Ew, Eh) (FIG. 3) and the bitmapped element size (Gw, Gh) (FIG. 7):

$$(ESx, ESy) = (Gw/Ew, Gh/Eh)$$

In step S25, whether or not processing for the coordinate value Pn(Xn, Yn) of the outline constructing the element is over, is checked. If YES, it is determined that the bitmapping of the element is over, and the processing for the element ends. If NO, the process proceeds to step S26, in which a coordinate value Bn(BXn, BYn) of the element to be bitmapped is obtained based on the coordinates Pn(Xn, Yn) and (ESx, ESy):

$$(BXn, BYn) = (ESx*Xn, Esy*Yn)$$

The coordinate value of each element to be bitmapped in the character bitmap memory 4 is determined by the thus-obtained address (BXn, BYn) of each element to be bitmapped.

Figure 9:
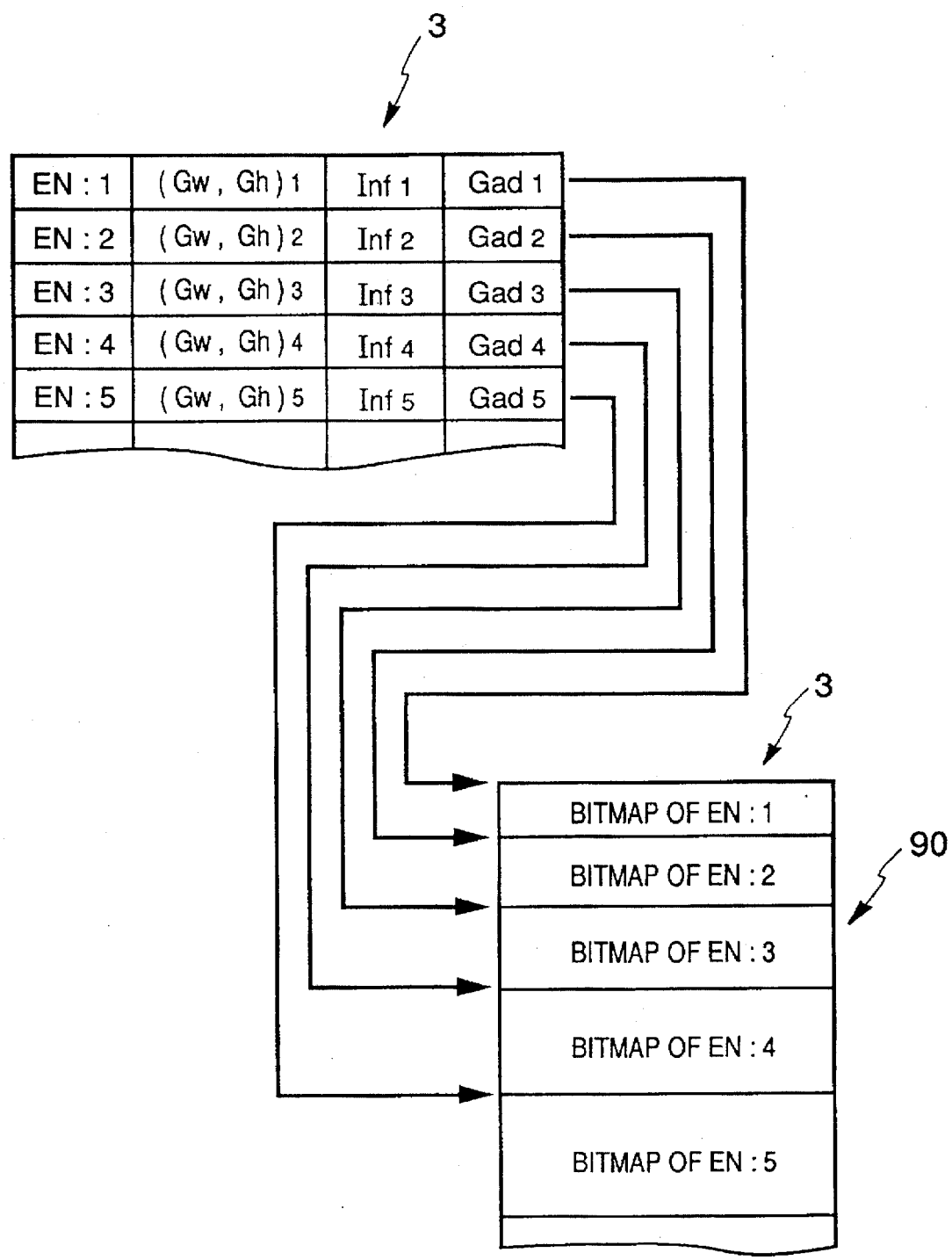
FIG. 9 illustrates data structure of a cache memory for storing bitmap data of the elements in this embodiment.

FIG. 9 shows in detail the data structure of the EB cache 3.

The EB cache 3 is a memory for temporarily storing the element bitmap data generated in step S9 of FIG. 6 and its additional information for re-use of the data. The EB cache 3 comprises the element number EN, the element size to be bitmapped (Gw, Gh) (FIG. 7) and the header address "Gad" in the area 90 in which the bitmap data corresponding to each element is stored. The EB cache 3 provides a once-bitmapped element when the same element pattern is again required to be bitmapped. In this manner, the bitmapping processing of step S9 can be omitted.

Figure 10:
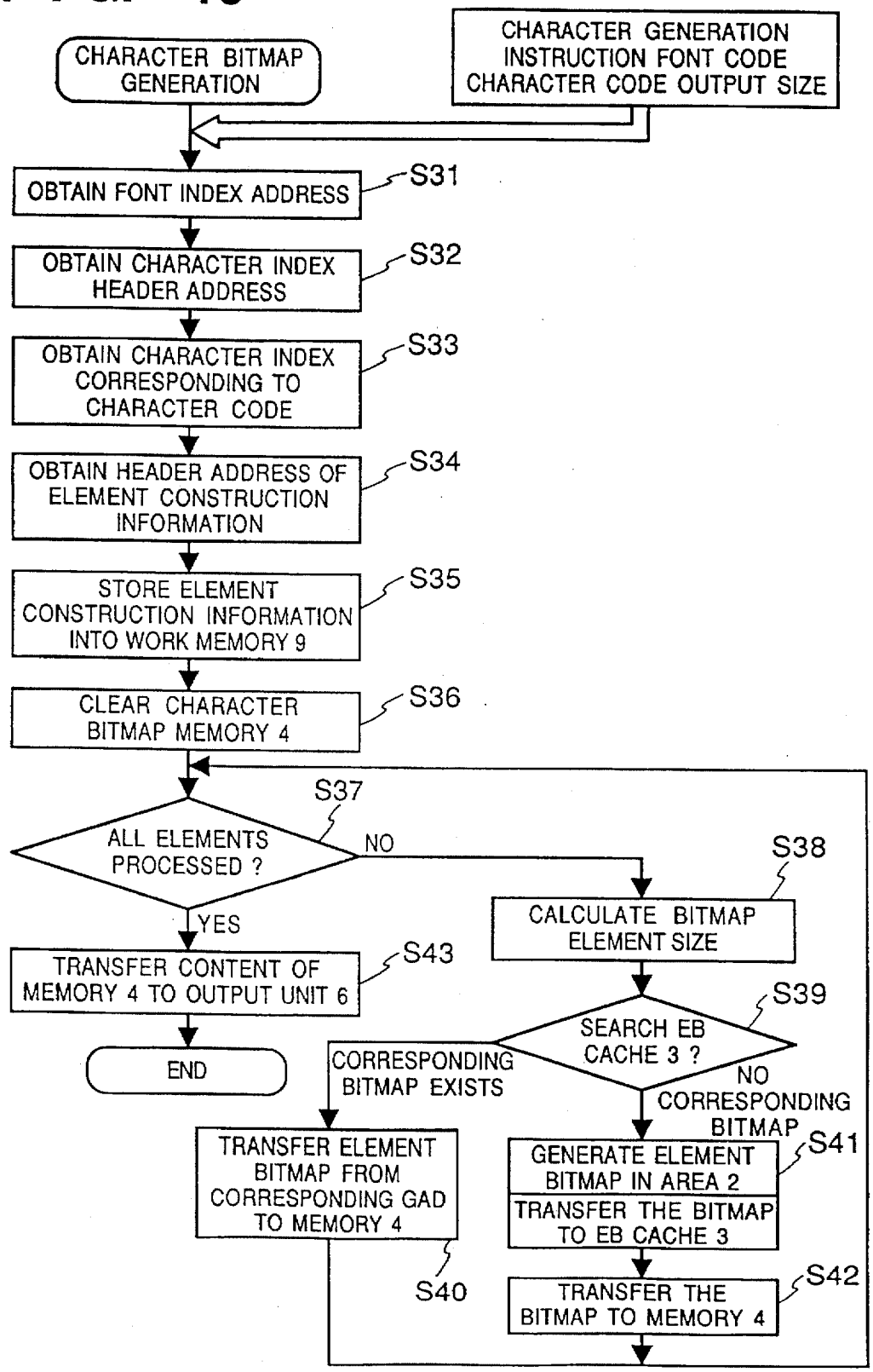
FIG. 10 is a flowchart showing character pattern generation processing in this embodiment in a case where an element bitmap cache is employed.

FIG. 10 is a flowchart showing character pattern mapping processing using the EB cache 3.

In step S31, based on a font code inputted from the input unit 5, an address of the font in the font index 21 is obtained. In step S32, a header address of the character index 22 is obtained based on the font index. In step S33, a character index corresponding to a character code designated from the input unit 5 is obtained from the header address of the character index 22. In step S34, a header address of a corresponding area in the element construction information 23 is obtained from the character index. In step S35, the element construction information is stored in the work memory 9. In step S36, the character bitmap memory 4 is cleared. This processing is identical to that in steps S1 to S5 in FIG. 6.

In step S37, whether or not processing for each element of the character is over, is examined. If YES, the process proceeds to step S43, while if NO, it proceeds to step S38, in which the each element size to be bitmapped is calculated. In step S39, the EB cache is searched for a required element number EN and the element size in which it is to be bitmapped (Gw, Gh). If there exist a corresponding element number EN and an element size to be bitmapped, processing proceeds to step S40, to refer to the Gad in FIG. 9 and read out the bitmap data. The read bitmap data is transferred to the character bitmap memory 4.

In step S39, if there is no corresponding element bitmap data in the EB cache 3, processing proceeds to step S41.

Similarly to step S9 in FIG. 6, bitmap data of the element is formed in the bitmap area 2. Next, the bitmapped element number EN, the element size (Gw, Gh) and the element bitmap data temporarily stored in the bitmap area 2 are transferred to an empty area of the EB cache 3, and at the same time, the header address Gad of the bitmap data is stored in the EB cache 3. In step S42, the element bitmap data (in the bitmap area 2) is transferred to the character bitmap memory 4. After step S40 or S42 is performed, processing returns to step S37 to perform the aforementioned processing.

In this manner, when pattern generation of all the elements is finished, process proceeds to step S43, in which the content of the character bitmap memory 4 is outputted to the output unit 6 for displaying/printing the character pattern.

As described above, the EB cache provides once-bitmapped data for re-use, which raises character pattern bitmapping speed. Further, if the EB cache is included in the system configuration, the element bitmap area 2 can be omitted. In this case, an empty area in the EB cache 3 is ensured, and element bitmap data is directly formed in the EB cache. Thereafter, in step S42, the bitmap data is transferred from the EB cache 3 to the character bitmap memory 4.

Figure 11:
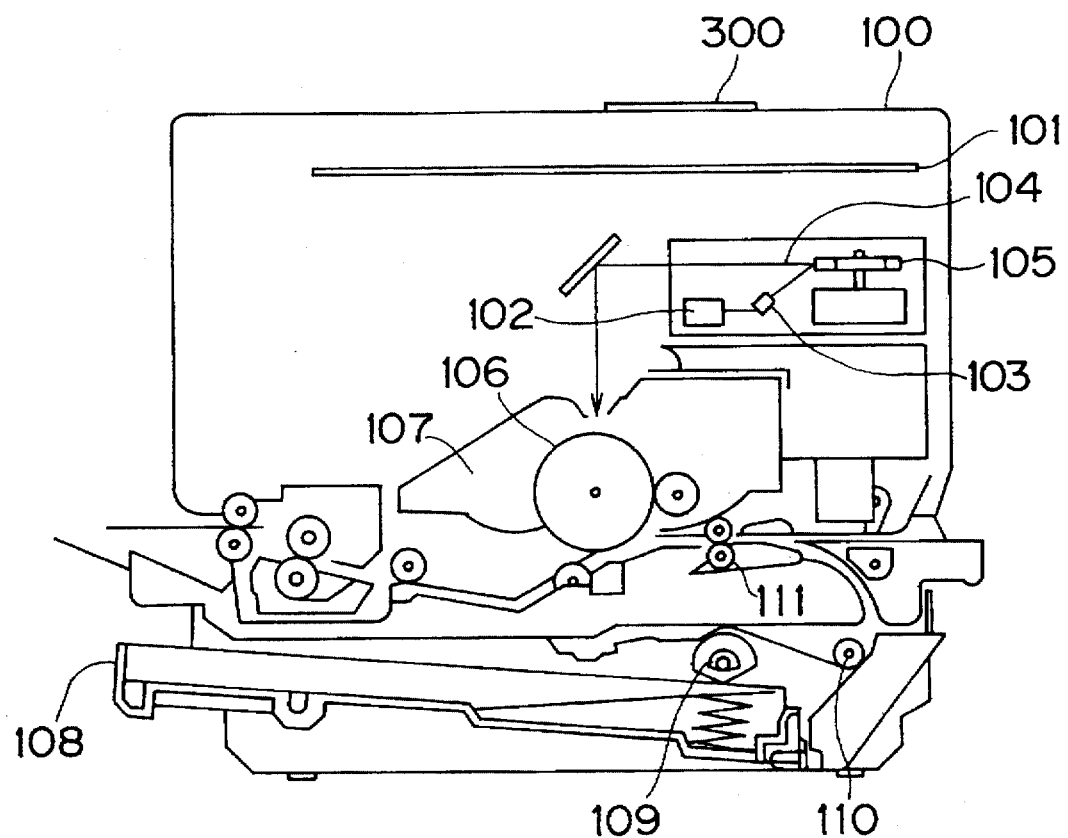
FIG. 11 is a cross-sectional view of a laser-beam printer applicable to an output unit of this embodiment.
Figure 12:
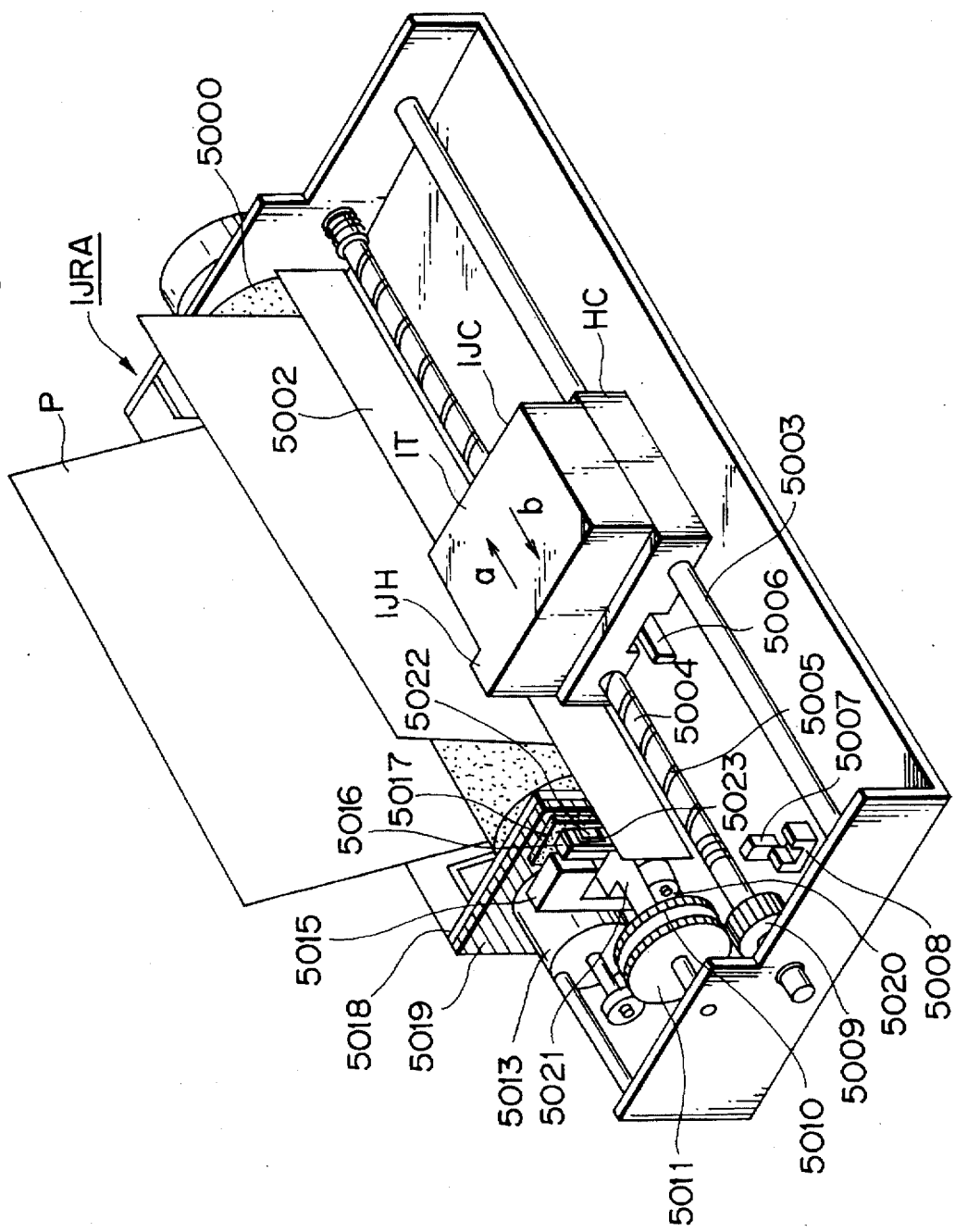
FIG. 12 is a perspective view of a recording portion of an ink-jet printer applicable to the output unit of this embodiment.

FIG. 11 is a cross-sectional view of a laser-beam printer (LBP) applicable to the output unit 6 of the present embodiment. FIG. 12 shows the structure of an ink-jet printer as an example of a lower-price output device. These output units 6 can be connected to the character generating apparatus (not shown) via e.g. an interface for controlling the apparatus. The character pattern data generated in the above-described processing can be visualized by printing on a recording medium such as paper.

In FIG. 11, reference numeral 100 denotes a LBP main body which inputs and stores information such as character pattern information supplied from the character generating apparatus connected to an external device. The LBP 100 forms an image on a recording sheet as a recording medium in accordance with the input information. Numeral 300 denotes a control panel provided with various control switches and LED display and so on; and 101, a printer control unit for controlling the overall the LBP 100 and analyzing input character pattern information. The printer control unit 101 mainly converts a character pattern to a video signal and outputs it to laser driver 102.

The laser driver 102 is a circuit for ON/OFF switching semiconductor laser 103 in accordance with an input video signal. Laser light 104 scans electrostatic drum 106 in a right-and-left direction using a polygonal mirror 105. An electrostatic latent image of a character pattern is formed on the electrostatic drum 106. The latent image is developed by developing unit 107 around the electrostatic drum 106 and transferred onto the recording sheet. The recording sheet is a cut sheet contained in a paper cassette attached to the LBP 100. The recording sheet is fed by conveying rollers 110 and 111, and supplied to the electrostatic drum 106.

FIG. 12 shows the structure of an ink-jet recording apparatus IJRA to which the present invention is applied. In FIG. 12, carriage HC is engaged with a spiral groove 5004 of a lead screw 5005 which rotates via driving force transmission gears 5011 and 5009 interlocking with forward/reverse rotation of driving motor 5013. The carriage has a pin (not shown) and is reciprocally moved in the directions represented by arrows a and b. The carriage HC has an ink-jet cartridge IJC. Paper bail 5002 presses a recording sheet against the platen 5000 along the movement direction of the carriage. Photocouplers 5007 and 5008 are home position detecting members for confirming the pressure of lever 5006 of the carriage in this area and changing over the rotational direction of motor 5013. A support member 5016 supports a cap 5022 for capping the front surface of the printing head. A suction member 5015 performs suction-restoration of the printing head inside the cap member 5022 via cap inner opening 5023. A member 5019 allows a cleaning blade 5017 to move in a back-and-forth direction. A main body support plate 5018 supports the member 5019 and the cleaning blade 5017. It is apparent that any publicly-known cleaning blade is applicable to the printer of the embodiments. Numeral 5021 denotes a lever for starting the sucking operation of the suction-restoration. The lever 5021 moves along the movement of a cam 5020 engaged with the carriage. A publicly-known transmission means such as change-over of a clutch controls a driving force from the driving motor.

When the carriage arrives at the home position, a desired processing (from among capping, cleaning and suction-restoration) is executed at its corresponding position by the lead screw 5005. Any of these processings is applicable to the printer of this embodiment, if a desired processing is performed at a publicly-known timing.

Figure 13:
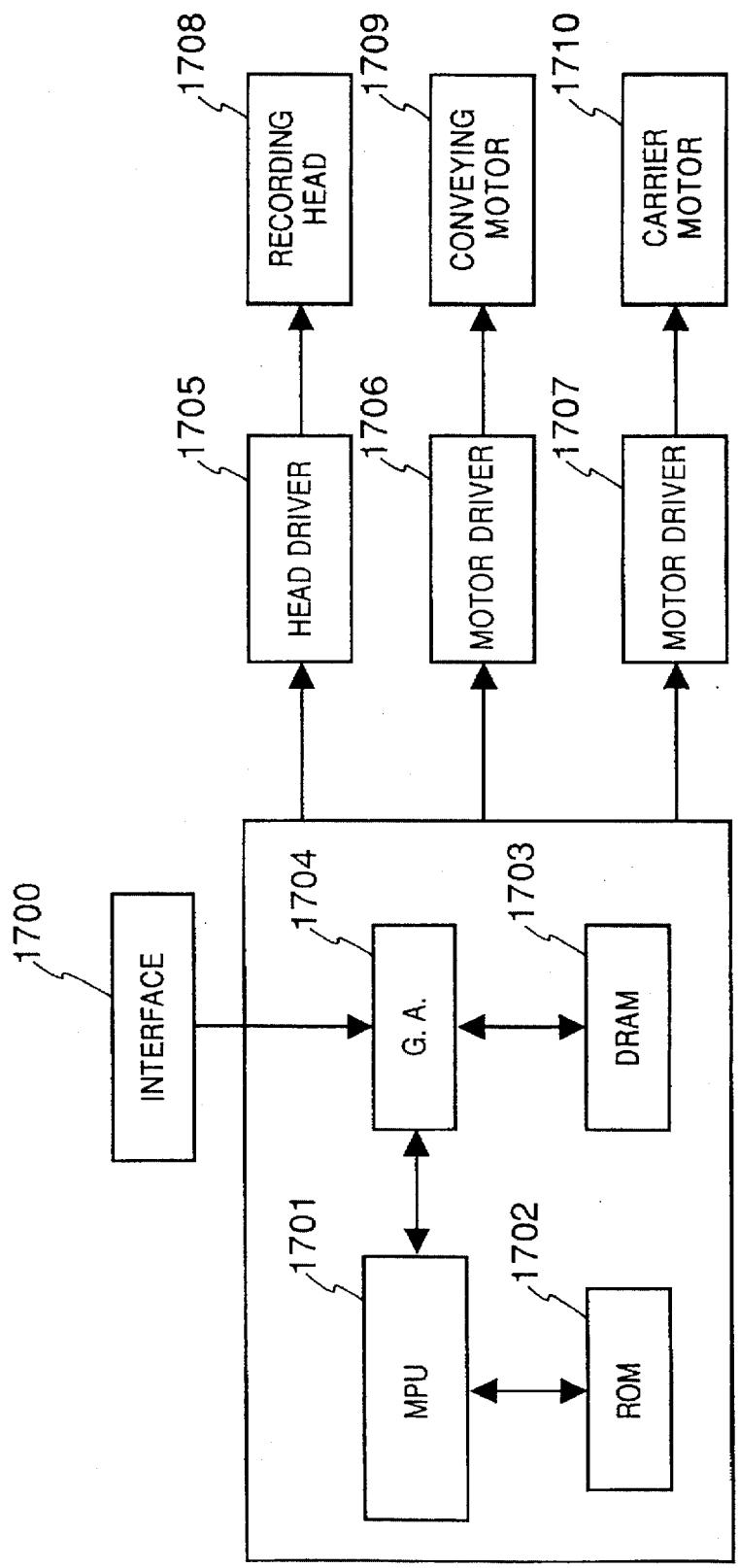
FIG. 13 is a block diagram showing the configuration of the ink-jet printer applicable to the output unit of this embodiment.

Next, the control system configuration for controlling the recording by the above recording apparatus will be described with reference to the block diagram of FIG. 13, showing a control circuit. In FIG. 13, reference numeral 1700 denotes an interface for inputting a recording signal; 1701, a MPU; 1702, a program ROM for storing control programs performed by the MPU 1701; 1703, a dynamic RAM for storing various data (the recording signal, recording data to be supplied to recording head 1708, etc.); 1704, a gate array for supplying the recording data to the recording head 1708, and for controlling data transfer among the interface 1700, the MPU 1701 and the RAM 1703; 1710, a carrier motor for carrying the recording head 1708; 1709, a conveying motor for conveying a recording sheet; 1705, a head driver for driving the head 1708; and 1706 and 1707, motor drivers for respectively driving the conveying motor 1709 and the carrier motor 1710.

In the above construction, when a recording signal enters the interface 1700, the signal is converted into recording data for printing between the gate array 1704 and the MPU 1701. The motor drivers 1706 and 1707 are activated, and the recording head is driven in accordance with the recording data transferred to the head driver 1705, thus printing is performed.

As described above, according to the present embodiment, figure information representing common figure elements for constructing a character are stored in the form of outline font, and upon necessity, each figure information is converted into bitmap data to form a character bitmap pattern. This enables high-speed generation of a high-quality character with a small memory capacity.

Further, figure information representing the common figure elements for constructing a character and construction information of the character are stored in the form of outline font, and bitmapped pattern data of the figure information can be stored in a cache memory. The cache memory is searched to examine whether or not bitmap data of a required element is already stored, and if it is stored, the bitmap data is read out for generating a character bitmap data. This achieves higher-speed generation of a high-quality character.

As described above, according to the present invention, a larger amount of font data can be stored with a smaller memory capacity.

Further, according to the present invention, the character pattern generating speed can be raised.

In addition, according to the present invention, already-bitmapped data of common figure information is temporarily stored, so that it can be re-used for high-speed generation of a high-quality character.

The present invention can be applied to a system constituted by a plurality of devices, or to an apparatus comprising a single device. Furthermore, it goes without saying that the invention is applicable also to a case where the object of the invention is attained by supplying a program to a system or apparatus.

As many apparently widely different embodiments of the present invention can be made without departing from the spirit and scope thereof, it is to be understood that the invention is not limited to the specific embodiments thereof except as defined in the appended claims.

What is claimed is:

1. A character pattern generating apparatus comprising:
    calculating means for, first, calculating a scale factor of a character based on a basic size and a designated size of the character;
    calculating means for, second, calculating a size of a stroke element which is at least part of a stroke of the character based on the scale factor of the character calculated by said first-calculating means and a basic size of the stroke element;
    calculating means for, third, calculating a scale factor of an element pattern to be generated, similar to the stroke element, based on the size of the stroke element calculated by said second-calculating means and a basic size of a common element pattern, said common element pattern being changed to stroke elements different in size by being extended or reduced in accordance with a scale factor of an element pattern;
    calculating means for, fourth, calculating coordinate values of the element pattern to be generated based on coordinate values of the common element pattern and the scale factor of the element pattern to be generated calculated by said third-calculating means; and
    generating means for generating an element pattern which is at least part of the stroke of the character pattern to be generated, based on the coordinate values of the element pattern to be generated calculated by said fourth-calculating means to obtain the character pattern composed of generated element patterns.

2. A character pattern generating apparatus according to claim 1, further comprising:
    storage means for storing the element pattern generated by said generating means with an element number and the size of the element; and
    judging means for judging whether the element pattern to be generated is stored in said storage means before generating the element pattern, based on the element number and the size of the element.

3. A character pattern generating apparatus according to claim 2, further comprising:
    transferring means for transferring the generated element patterns into a bitmap memory; and
    printing means for printing a character pattern composed of the generated element patterns transferred by said transferring means.

4. A character pattern generating apparatus according to claim 2, further comprising:
    transferring means for transferring the generated element patterns into a bitmap memory; and
    display means for displaying a character pattern composed of the generated element patterns transferred by said transferring means.

5. A character pattern generating apparatus according to claim 1, further comprising:
    transferring means for transferring the generated element patterns into a bitmap memory; and
    printing means for printing a character pattern composed of the generated element patterns transferred by said transferring means.

6. A character pattern generating apparatus according to claim 1, further comprising:
    transferring means for transferring the generated element patterns into a bitmap memory; and
    display means for displaying a character pattern composed of the generated element patterns transferred by said transferring means.

7. A character pattern generating method comprising the steps of:
    first calculating a scale factor of a character based on a basic size and a designated size of the character;
    second calculating a size of a stroke element which is at least part of a stroke of the character based on the scale factor of the character calculated in said first calculating step and a basic size of the stroke element;
    third calculating a scale factor of an element pattern to be generated, similar to the stroke element, based on the size of the stroke element calculated in said second calculating step and a basic size of a common element pattern, said common element pattern being changed to stroke elements different in size by being extended or reduced in accordance with a scale factor of an element pattern;
    fourth calculating coordinate values of the element pattern to be generated based on coordinate values of the common element pattern and the scale factor of the element pattern to be generated calculated in said third calculating step; and
    generating an element pattern composing the stroke of the character pattern to be generated, based on the coordinate values of the element pattern to be generated calculated in said fourth calculating step to obtain the character pattern composed of generated element patterns.

8. A character pattern generating method according to claim 7, further comprising the steps of:
    storing in a storage means the element pattern generated in said generating step with an element number and the size of the element; and
    judging whether the element pattern to be generated is stored in the storage means before generating the element pattern, based on the element number and the size of the element.

9. A character pattern generating method according to claim 8, further comprising the steps of:
    transferring the generated element patterns into a bitmap memory; and
    printing a character pattern composed of the generated element patterns transferred in said transferring step.

10. A character pattern generating method according to claim 8, further comprising the steps of:
    transferring the generated element patterns into a bitmap memory; and displaying a character pattern composed of the generated element patterns transferred in said transferring step.

11. A character pattern generating method according to claim 7, further comprising the steps of:

transferring the generated element patterns into a bitmap memory; and printing a character pattern composed of the generated element patterns transferred in said transferring step.

12. A character pattern generating method according to claim 7, further comprising the steps of:

transferring the generated element patterns into a bitmap memory; and displaying a character pattern composed of the generated element patterns transferred in said transferring step.

* * * * *

UNITED STATES PATENT AND TRADEMARK OFFICE
CERTIFICATE OF CORRECTION

PATENT NO. : 5,673,064

DATED : September 30, 1997

INVENTOR(S): KUNIO SETO

It is certified that error appears in the above-identified patent and that said Letters Patent is hereby corrected as shown below:

<u>ON TITLE PAGE AT [57], ABSTRACT</u>
Line 2, "enables" should read --enable--.

<u>SHEET 1</u>
Insert the title --FIG. 1--.

<u>COLUMN 1</u>
Line 15, "displayed" should read --display--;
Lines 20 & 21, "in the form" should read --to form--.

<u>COLUMN 2</u>
Line 7, "set" should read --sets--.

<u>COLUMN 3</u>
Line 3, "a" should read --an--;
Line 26, "Bus)," should read --Bus) type,--;
Line 27, delete "type";
Line 33, "such as CRT" should read --such as a CRT--;
Line 43, "reference" should read --reference to--;
Line 45, "Kanji" should read --Kanji " 付 "--;
Line 46, delete " 付 ";
Line 64, "of" should read --for--.

<u>COLUMN 4</u>
Line 22, delete "*" (asterisk).

<u>COLUMN 5</u>
Line 17, delete "proceeds".

UNITED STATES PATENT AND TRADEMARK OFFICE
CERTIFICATE OF CORRECTION

PATENT NO. : 5,673,064

DATED : September 30, 1997

INVENTOR(S): KUNIO SETO

It is certified that error appears in the above-identified patent and that said Letters Patent is hereby corrected as shown below:

<u>COLUMN 8</u>
Line 4, "cap" should read --cap member--.

Signed and Sealed this

Twelfth Day of May, 1998

BRUCE LEHMAN

*Attest:*

*Attesting Officer*   Commissioner of Patents and Trademarks